United States Patent
Grubbs et al.

(10) Patent No.: US 6,714,953 B2
(45) Date of Patent: Mar. 30, 2004

(54) SYSTEM AND METHOD FOR MANAGING FILE EXPORT INFORMATION

(75) Inventors: Mark Allen Grubbs, Round Rock, TX (US); Gerald Francis McBrearty, Austin, TX (US); Wu Zheng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 09/886,185

(22) Filed: Jun. 21, 2001

(65) Prior Publication Data

US 2003/0009449 A1 Jan. 9, 2003

(51) Int. Cl.[7] .............................................. G06F 17/30
(52) U.S. Cl. ..................................................... 707/205
(58) Field of Search ......................................... 707/205

(56) References Cited

U.S. PATENT DOCUMENTS

| | | | | |
|---|---|---|---|---|
| 5,463,772 A | * | 10/1995 | Thompson et al. | 707/101 |
| 5,485,579 A | * | 1/1996 | Hitz et al. | 709/221 |
| 5,675,748 A | * | 10/1997 | Ross | 710/104 |
| 5,758,334 A | * | 5/1998 | Knight et al. | 707/2 |
| 5,909,540 A | * | 6/1999 | Carter et al. | 714/4 |
| 5,918,229 A | * | 6/1999 | Davis et al. | 707/10 |
| 5,920,828 A | * | 7/1999 | Norris et al. | 702/14 |
| 6,330,572 B1 | * | 12/2001 | Sitka | 707/205 |
| 6,356,863 B1 | * | 3/2002 | Sayle | 703/27 |
| 6,374,402 B1 | * | 4/2002 | Schmeidler et al. | 717/167 |
| 2001/0051955 A1 | * | 12/2001 | Wong | 707/201 |
| 2002/0156984 A1 | * | 10/2002 | Padovano | 711/148 |

* cited by examiner

Primary Examiner—Wayne Amsbury
(74) Attorney, Agent, or Firm—Scott A. Schmok; Joseph T. Van Leeuwen; Diana L. Roberts

(57) ABSTRACT

A system and method for including export information in the file system extended attribute data area is provided. File export information is determined by a system administrator or automated process. The determined export information is stored in an extended attribute data area corresponding with the file. When a computer system issues mount commands for the file systems to be mounted, the file system provides export information included in the extended attributes to the kernel whereupon the kernel exports the file system. Maintenance of file export information is thereby reduced. Backup, replications, and restorations of file systems is simplified by maintaining the export information along with the files being backed, replicated, or restored. For example, when the system administrator backs up a file, the export information in the extended attributes is backed-up as well. When the file system is retrieved, the export information is also retrieved within the extended attributes.

14 Claims, 7 Drawing Sheets

SYSTEM AND METHOD FOR MANAGING FILE EXPORT INFORMATION

BACKGROUND OF THE INVENTION

1. Technical Field

The present invention relates in general to a method and system for including file export information within a corresponding file system. Still more particularly, the present invention relates to a method and system for including export information in a file system extended attributes data area.

2. Description of the Related Art

The Network File System (NFS) is a distributed file system that allows users to access files and directories located on remote computers and treat those files and directories as if they were local. For example, users may use operating system commands to create, remove, read, write, and set file attributes for remote files and directories. NFS provides services through a client-server relationship. Computers that include file systems, or directories, or other resources available for remote access are called servers. Computers that use a server's resources are considered clients.

The act of servers making file systems available for clients is called exporting. In traditional network file systems, a server has an export file that includes NFS information for file systems being accessed by the server. Upon boot-up, the server loads the export file into a kernel. The network file system kernel then performs a file system mounting process which makes the mounted file systems available for authorized clients.

If two servers access the same file systems on the same disk, each server has individual export files that are maintained by a system administrator. The export file includes information about the file system such as the location of file systems (pathname), who has access privileges, and if the file system is write protected. If a change in the export information is preferred, the system administrator modifies the export file on both servers. For example, if a new user is added to the access list for a file system, the system administrator adds the new user to the export file on both servers.

A challenge found in traditional systems is the ability to manage export information due the dynamics of a distributed network such as NFS. Tasks such as adding, deleting, relocating and changing file system export information often cause system administrators to update multiple export files. Each server has an export file that includes export information for file systems maintained by the server. If a file system's export information changes, the system administrator makes changes to the export file for each server that supports the file system.

Another challenge found in traditional systems is during back-up and restore operations. When file systems are backed-up, the export information is not backed-up and linked to the corresponding file system. When the file system is restored, the export information needs to be added to the export file on the server. Adding the export information often includes the system administrator performing manual processes to add the appropriate export information.

What is needed, therefore, is a way to reduce file export information maintenance by including export information as part of the file system itself.

SUMMARY

It has been discovered that by including NFS export information in a file system extended attributes data area, maintenance of the export information is reduced. The file system includes information about the files as well as an optional data area, called "extended attributes" for storing additional information about the file. In IBM's AIX™ operating system, the extended attribute data area is capable of storing thousands of additional bytes of information pertaining to data files. The export information is included in the file system itself and not in the export file on a server. When a new file system is created, the system administrator determines the file export information and provides it to the corresponding file system extended attributes. The system administrator determines export information that includes the location of the file system (pathname), who has access privileges, and if the file system is write protected. If the file system export information needs to be changed, the system administrator updates the export information in the file system extended attribute data area. For example, the system administrator updates the export information in the extended attribute data when a new user is allowed access to the file system. The system administrator can also select if he wants to have the NFS export information automatically provided to the kernel during a file mount. If the system administrator wants more control of what is exported, he may manually export the file.

Upon boot-up, the server issues mount commands to the file systems it wants to have access to. When the mount command is received, the file system provides export information included in the extended attributes to the kernel whereupon the kernel exports the file system. This makes the maintenance of the file exports automatic on file system mount and unmount. It also makes it easier to backup, replicate, and restore file systems. For example, when the system administrator backs up a file, the export information in the extended attributes is backed-up as well. When the file system is retrieved, the export information is also retrieved within the extended attributes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
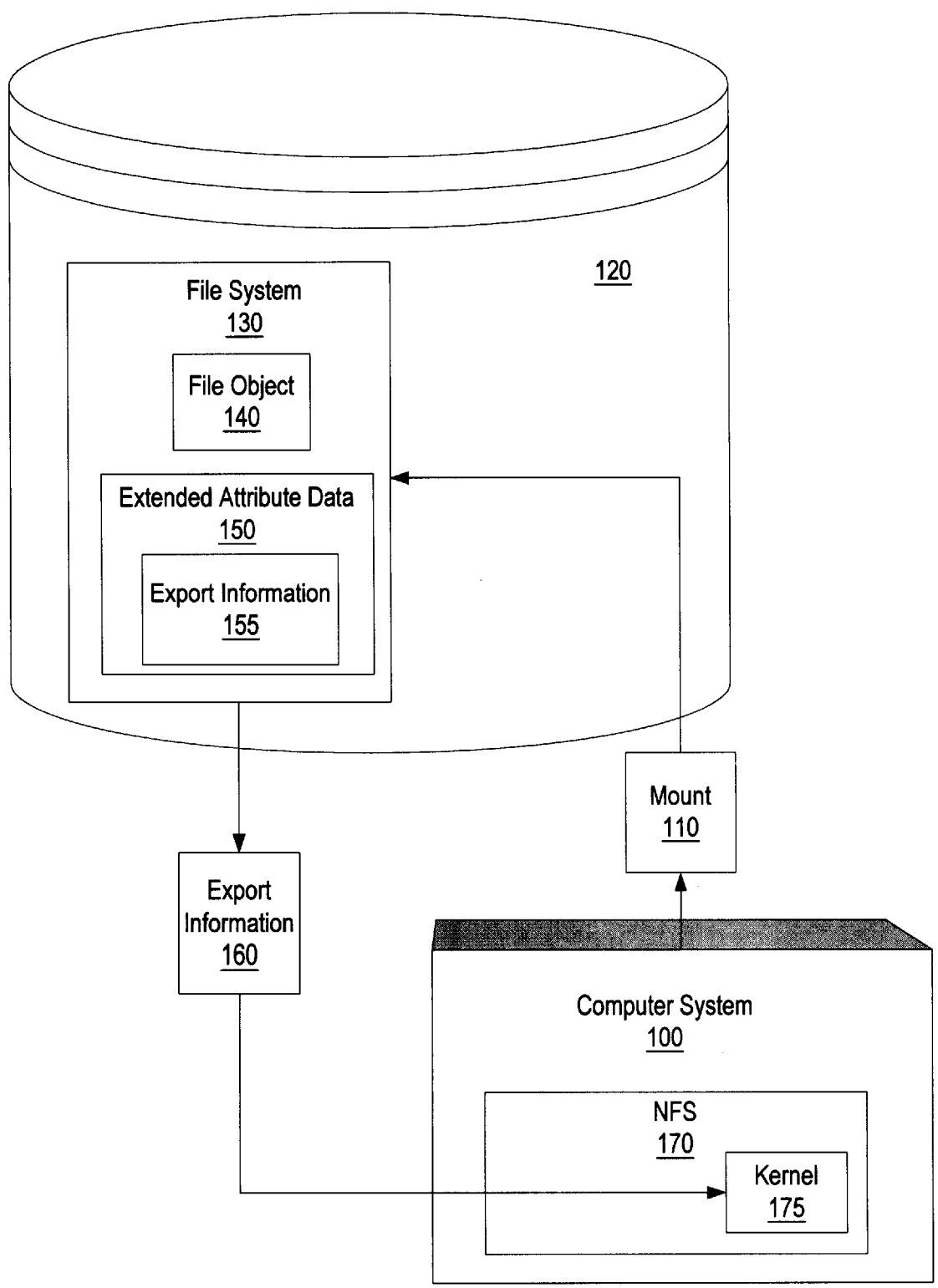
FIG. 1 is a high level diagram of a computer system with a file system that includes extended attribute data.

FIG. 1 is a high level diagram of a computer system with a file system that includes extended attribute information. Computer system 100 includes an operating system for controlling the operation of the system. Computer system 100 also includes a Network File System (NFS) 170 and network file system kernel 175 that is used for managing files being mounted and exported. Upon bootup, server 100 issues mount command 110 to file system 130. Mount commands can also be performed by a user, operator, or automated process after the system has booted up. Files and information about files within file system 130 are stored on nonvolatile storage device 120, such as a disk drive. Nonvolatile storage device 120 can be included with a computer system or can be a separate device accessible to one or more computer systems using a computer network. File system 130 includes file object 140 which includes data stored in files. For example, in a word processing application file object 140 would store the data entered by the user, such as a report, article, or the like. File system 130 manages information about the files maintained by the file system. Some file system data is maintained as file system data, such as the location of specific files, the name of the files, the length of the files, etc. File system 130 also includes extended attribute data 150 that correspond to file object 140. To conserve nonvolatile storage space, extended attributes are often optional attributes that pertain to a particular application or process. Extended attribute data 150 includes optional data pertaining to file object 140 that is maintained by the file system but provided by the system administrator, user, or application program. Extended attribute data 150 includes export information 155 that corresponds to file object 140. Examples of what information is included in export information 155 are the pathname of file system 130, access privileges of file system 130, and write protection privileges of file system 130. Files that have been identified to be shared, or exported, to other computer systems include export information in their corresponding extended attributes while other files that have not been identified to be exported do not include the export information within their corresponding extended attributes. When file system 130 receives mount command 110 from computer system 100, file system 130 provides export information 160 to file system kernel 175 whereupon file system 130 is mounted and exported.

Figure 2A:
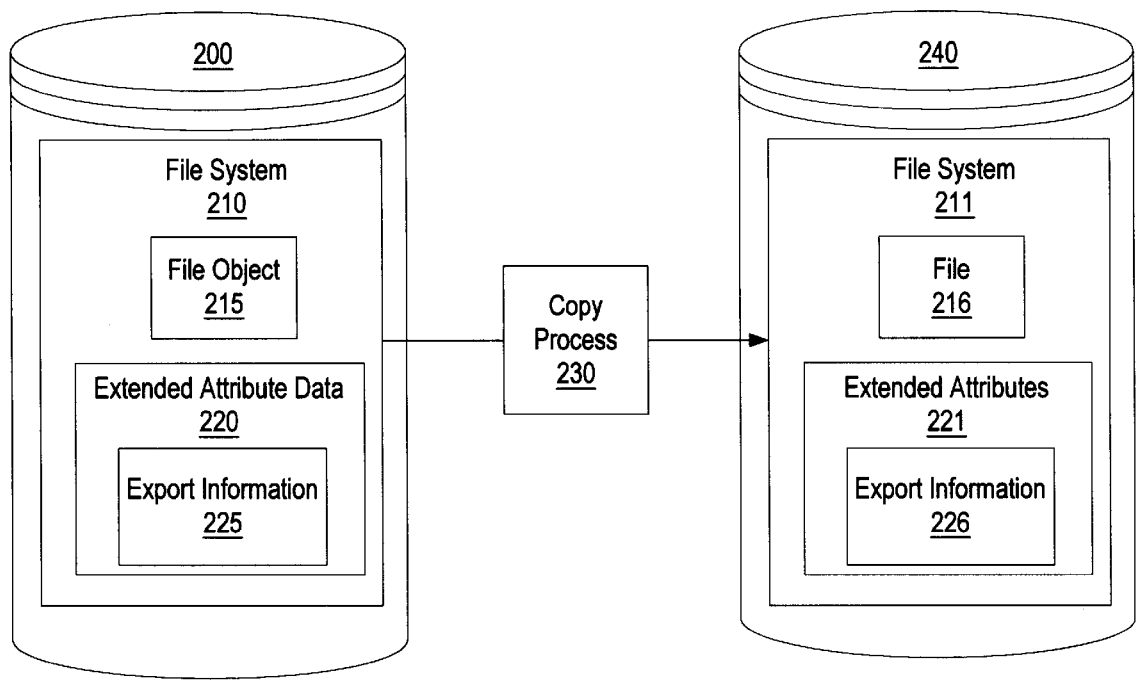
FIG. 2A is a diagram of a file being duplicated from one non-volatile storage area to another.

FIG. 2A is a diagram of a file being duplicated from one non-volatile storage area to another. Nonvolatile storage area 200 includes file system 210. File system 210 includes file object 215 which includes any variety of data that is stored in a computer file. For example, in a word processing application file object 215 would store the data entered by the user, such as a report, article, or the like. File system 210 also includes extended attribute data 220 that correspond to file object 215. Extended attribute data 220 includes data pertaining to file object 215 that is maintained by the file system or system administrator. Extended attribute data 220 includes export information 225 that corresponds to file object 215.

When file system 210 is copied (process 230) to file system 211 on nonvolatile storage device 240, file object 215 is copied to file object 216 on nonvolatile storage device 240, extended attribute data 220 is copied to extended attribute data 221, and export information 225 is copied to export information 226. File system 211 maintains information about file object 216, such as the address of the file on nonvolatile storage device 240, the name of the file object, etc. For example, when a file is copied during standard back-up the file and the file system are stored on a backup media, such as a magnetic tape. When the file is restored from the backup media, the corresponding export information is also restored along with the file system. Another example of when a file is copied is during support replication used to accurately recreate a situation in order to analyze problems occurring with the computer system. When the file is copied to a non-volatile storage area for support replication, the export information is also copied.

Figure 2B:
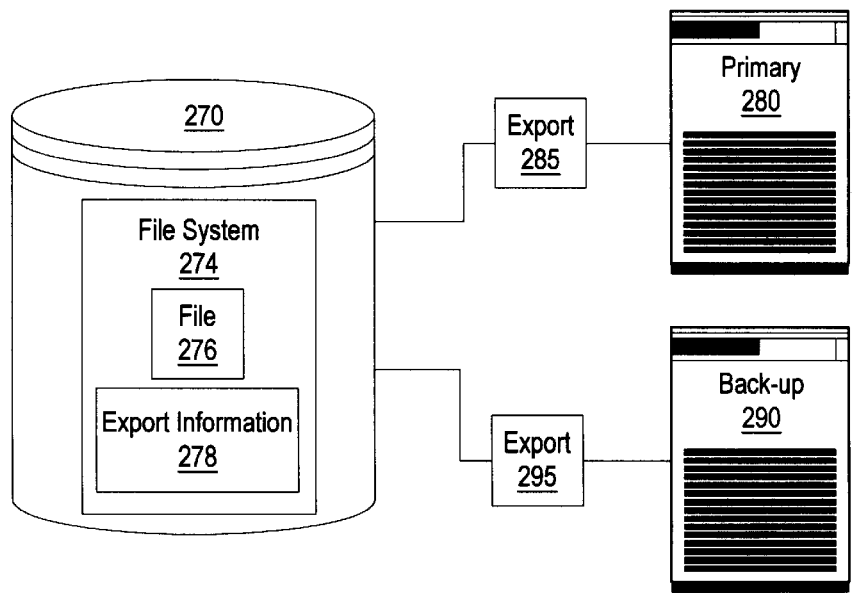
FIG. 2B is a diagram of a non-volatile storage area providing information to a primary computer system and back-up computer system.

FIG. 2B is a diagram of a non-volatile storage area providing information to a primary computer system and back-up computer system. In this example, the export information is used so that multiple computer systems, often servers, can access and manage the same files stored on a common nonvolatile storage area. Upon boot-up, primary computer system 280 receives export information 285 from extended attribute data corresponding to file object 276 and mounts the file. As long as primary computer system 280 is operational, back-up computer system 290 may not receive information from non-volatile storage area 270. When primary computer system 280 is not operational, back-up computer system 290 receives export information 295 from extended attribute data corresponding to file object 276 and mounts the file. For example, if a power outage caused primary computer system 280 to become inoperable, back-up computer system 290 takes over as the computer system to support users. In addition, some files are used by many computer systems simultaneously. In these situations, many computer systems would be able to access file 276 using corresponding export information 278.

Figure 3:
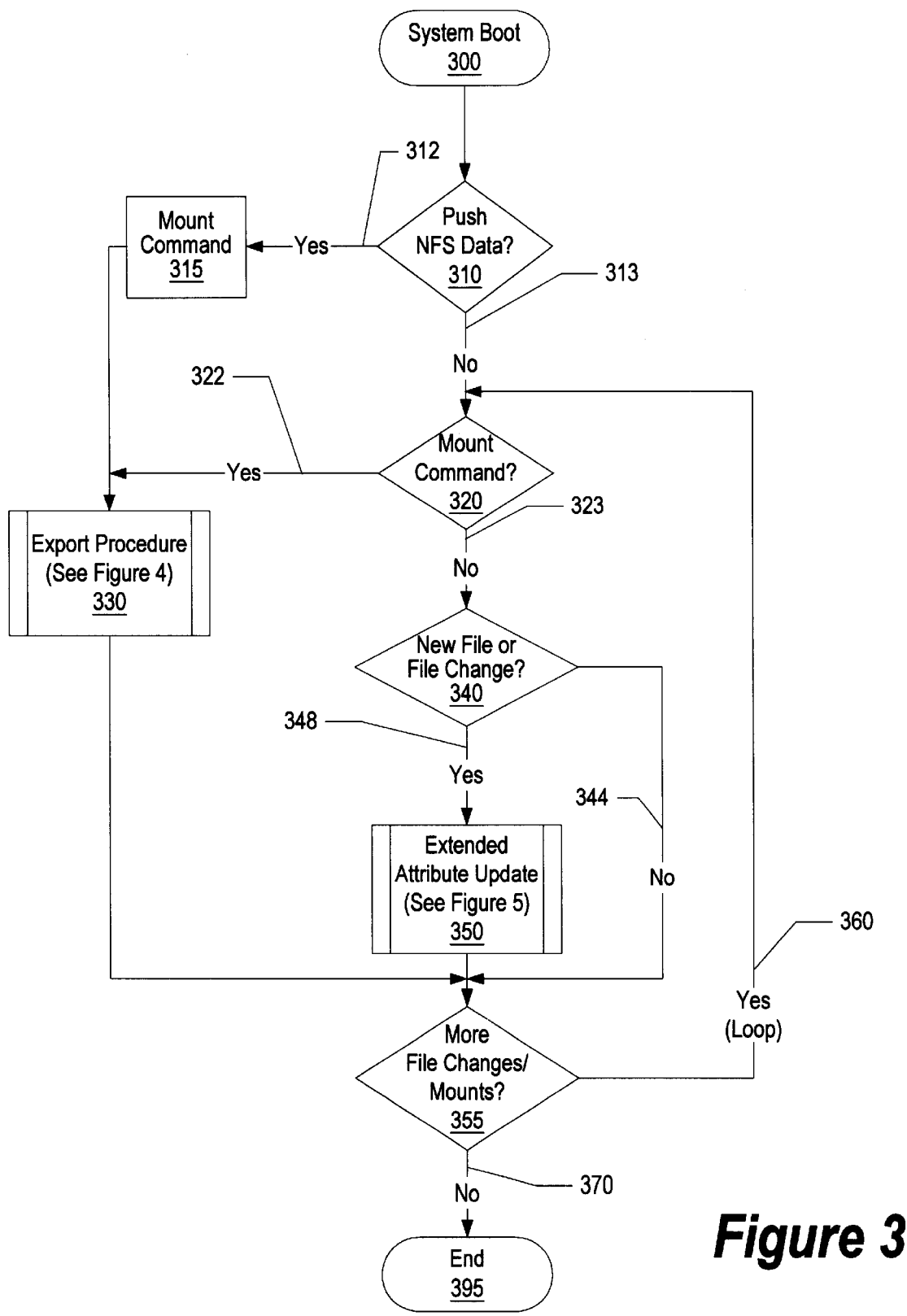
FIG. 3 is a flowchart showing the system boot-up and file exporting process.

FIG. 3 is a flowchart showing the system boot-up and export process. System boot commences at 300, whereupon a determination is made as to whether a system administrator chooses to automatically provide export information to a network file system kernel during a system boot (decision 310). If the system administrator chooses to automatically provide export information, decision 310 branches to "yes" branch 312 whereupon a mount command is issued (step 315) and export procedure is processed (pre-defined process block 330, see FIG. 4 for further details). On the other hand, if the system administrator does not choose to automatically provide export information, decision 310 branches to "no" branch 313 whereupon a determination is made as to whether a mount command is issued (step 320). For example, mount commands are issued from back-up computer systems after the original boot-up process if the primary computer system becomes inoperable. If a mount command is issued, decision 320 branches to "yes" branch 322 whereupon an export procedure is processed (pre-defined process block 330, see FIG. 4 for further details). On the other hand, if a mount command is not issued, decision 320 branches to "no" branch 323 whereupon a determination is made as to whether a new file is added or there is a change in export information for an existing file (decision 340). If a new file is added or there is a change in export information for an existing file, decision 340 branches to "yes" branch 348 whereupon extended attribute update is processed (pre-defined process block, see FIG. 5 for further details). On the other hand, if a new file is not added or there are no changes to export information for existing files, decision 340 branches to "no" branch 344 bypassing the extended attribute update process.

A determination is made as to whether any more file changes or mount requests (i.e., from the operator, a user, an external computer system, an automated process, etc.) have been received (decision 355). If more requests have been received, processing branches to "yes" branch 360 which loops back to process the next request. This looping continues until the computer system is shut down or otherwise stops using export file information, at which time decision 355 branches to "no" branch 370 whereupon processing ends at 395.

Figure 4:
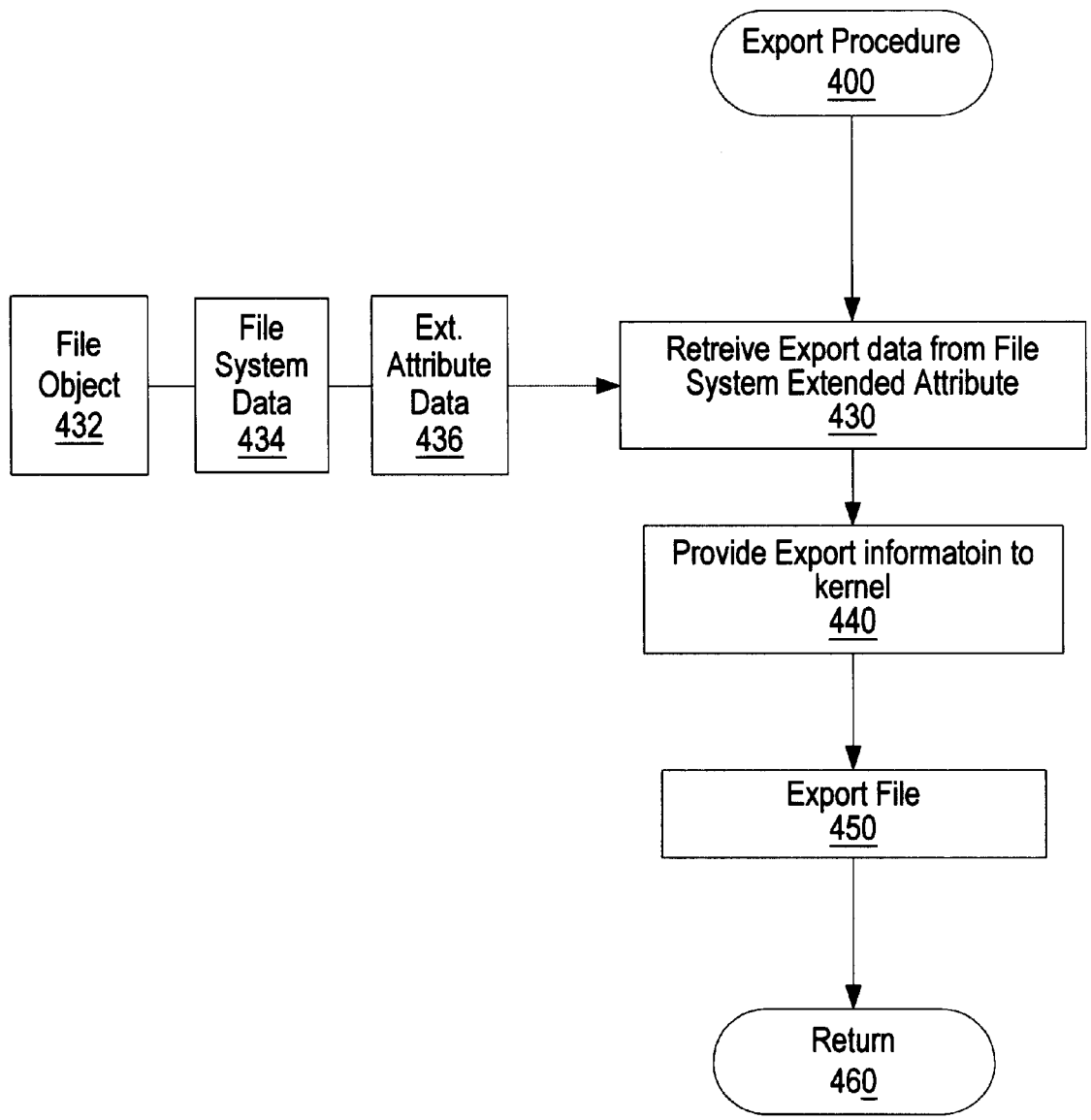
FIG. 4 is a flowchart showing the export information being provided from a file system extended attributes data area.

FIG. 4 is a flowchart showing export information being provided from a file system extended attribute data area. Export processing commences at 400 whereupon export information is retrieved (step 430) from the extended attribute data area 436 (step 430). Extended attributed data area 436 is referenced by file system data 434 that corresponds to the file being exported (file object 432). File system data 434 is maintained by the file system and includes system data regarding file object 432. System maintained data included in file system data 434 includes such things as the date and time file objects were last used, when they were created, the size of the file objects, security information pertaining to the file objects, and name and location of the file objects within the nonvolatile storage device. Information in the export information includes the location of the corresponding file (pathname), who has access privileges (and what type of privileges those users have), and whether the file is read only. The export information is provided to the network file system kernel at step 440, whereupon the desired file is exported (step 450) and processing returns at 460.

Figure 5:
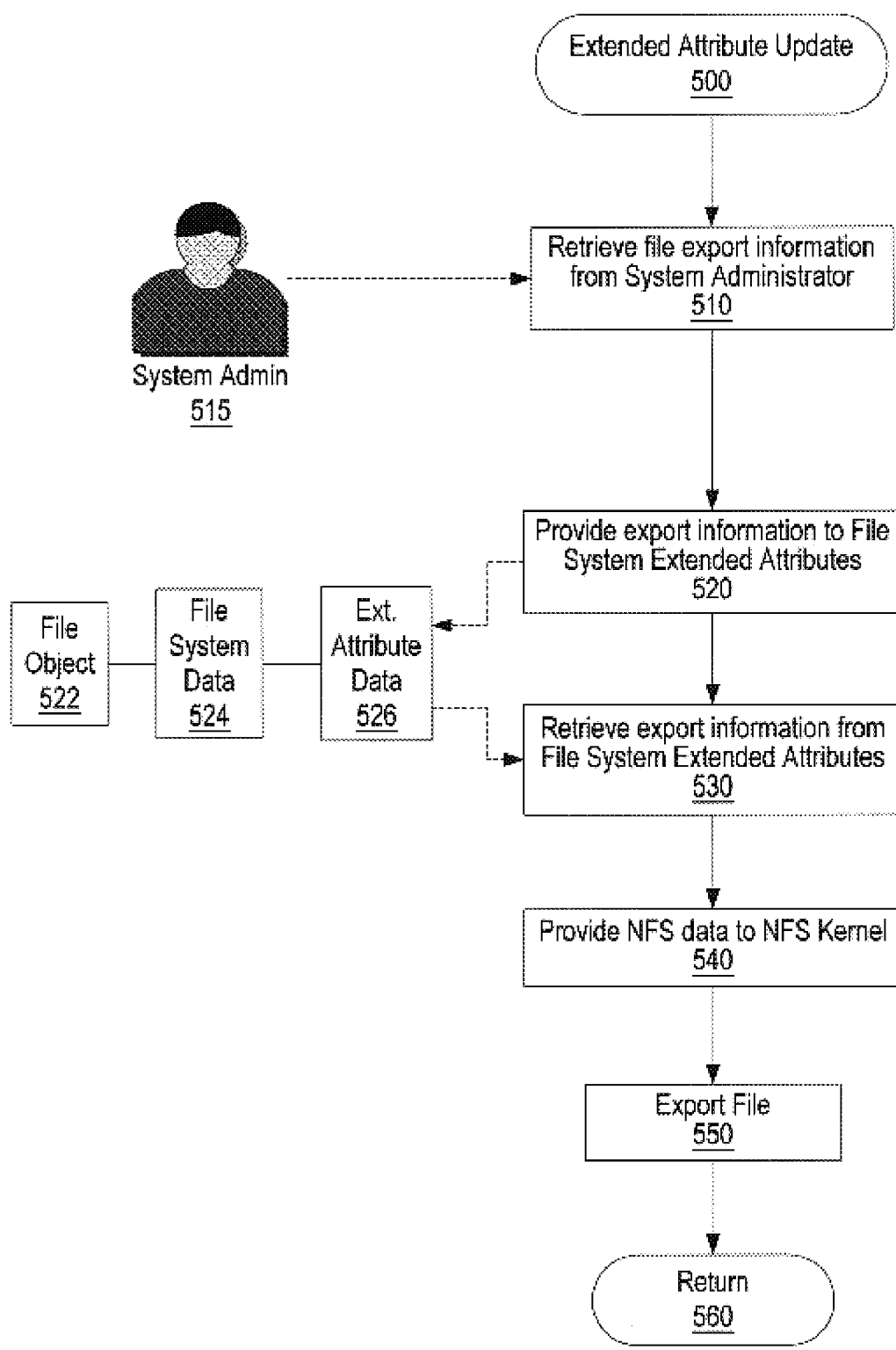
FIG. 5 is a flowchart showing the export information in the extended attributes being modified for a file system.

FIG. 5 is a flowchart showing the export information in the extended attributes being updated for a file system. Extended attribute update processing commences at 500, whereupon system administrator 515 (or a process simulating the export setup activities typically performed by a system administrator) updates the export information for the corresponding file system (step 510). For example, when a new user is allowed access to the file system, the system administrator adds the user to the list of authorized users included in the export information. Another example is when a new file is created, the system administrator provides the proper export information.

The updated export information is provided to extended attribute data area 526 (step 520). Extended attributed data area 526 is part of file system data 524 that corresponds to file object 522. File system data 524 is maintained by the file system and includes system data regarding file object 522. System maintained data included in file system data 524 includes such things as the date and time file objects were last used, when they were created, the size of the file objects, security information pertaining to the file objects, and name and location of the file objects within the nonvolatile storage device.

After the updated file export information is stored in the corresponding extended attribute data area, the updated export information is able to be retrieved from extended attribute data area (step 530). The data is provided to the network file system kernel (step 540) whereupon the file is exported (step 550) and processing returns at 560.

Figure 6:
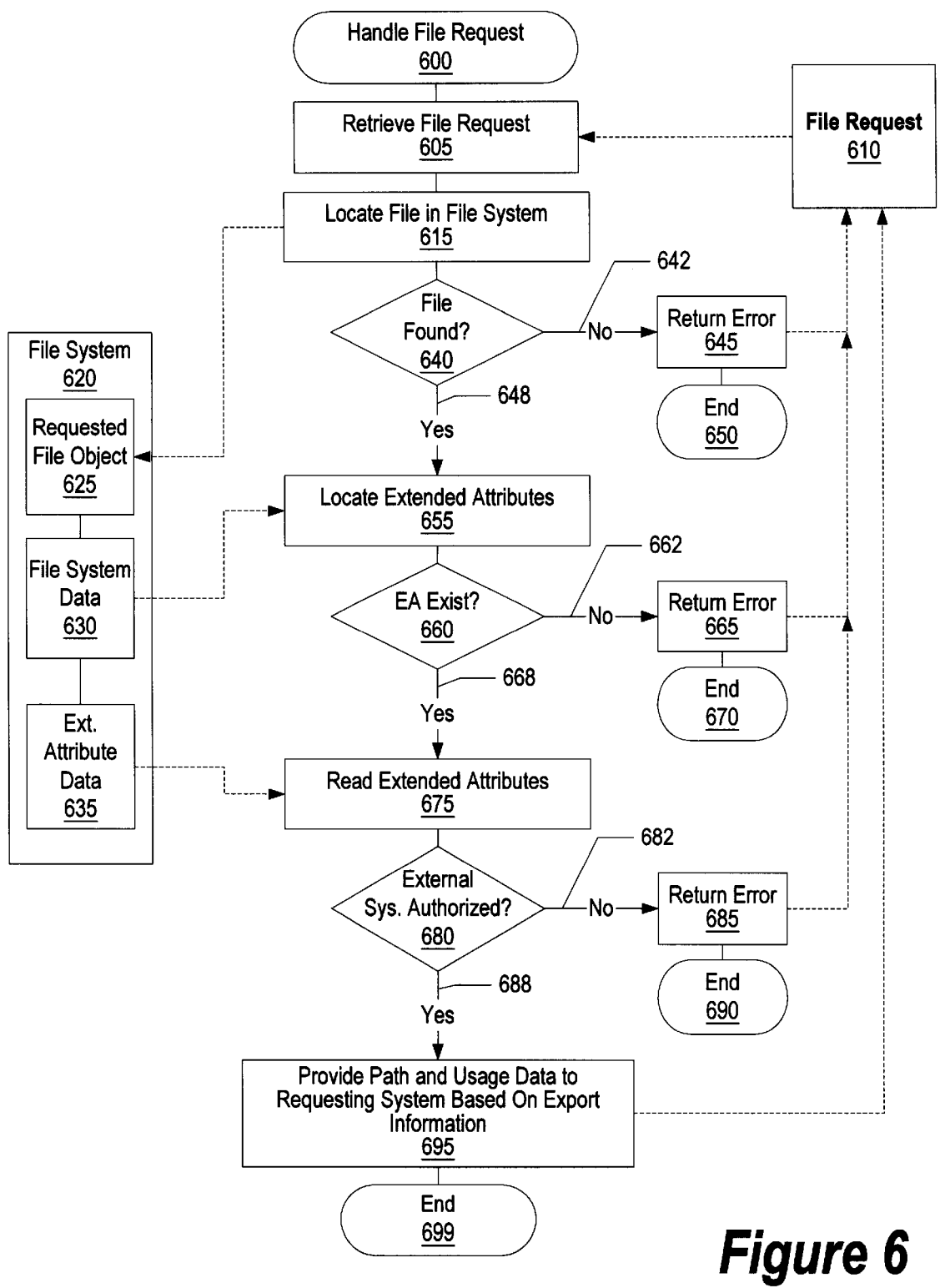
FIG. 6 is a flowchart showing a computer system responding to a file.

FIG. 6 is a flowchart showing a computer system responding to a file request. For example, file requests come from a system administrator or an external computer system. File request processing commences at 600, whereupon file request 610 is received at step 605. Requested file object 625 is located (step 615) from file system 620. A determination is made as to whether the requested file is located (decision 640). If the requested file is not located, decision 640 branches to "no" branch 642 whereupon an error message is returned (step 645) to file request 610 whereupon processing ends at 650. On the other hand, if the requested file is located, decision 640 branches to "yes" branch 648 whereupon extended attributes are located (step 655) from file system data 630 corresponding to file object 625. A determination is made as to whether extended attributes were located (decision 660). If the extended attributes are not located, decision 660 branches to "no" branch 662 whereupon an error message is returned (step 665) to file request 610 whereupon processing ends at 670. On the other hand, if extended attributes are found, decision 660 braches to "yes" branch 668 whereupon extended attribute data 635 is retrieved (step 675). A determination is made as to whether file request 610 has authorization for file object 625 (decision 680). If file request 610 does not have authorization for file object 625, decision 680 branches to "no" branch 682 whereupon an error message is returned (step 685) to file request 610 whereupon processing ends at 690. On the other hand, if file request 610 has authorization for file object 625, decision 680 branches to "yes" branch 688 whereupon the pathname and usage data are provided to file request 610 (step 695) and processing ends at 699. In some embodiments, the export data used for processing FIG. 6 is preloaded from the extended attribute data area into a data structure maintained by a network file system (NFS) when a file system is mounted. In these embodiments the NFS makes the determinations regarding file availability, export information, and authorizations based on the preloaded information and returns the appropriate errors or file data to file request process 610.

Figure 7:
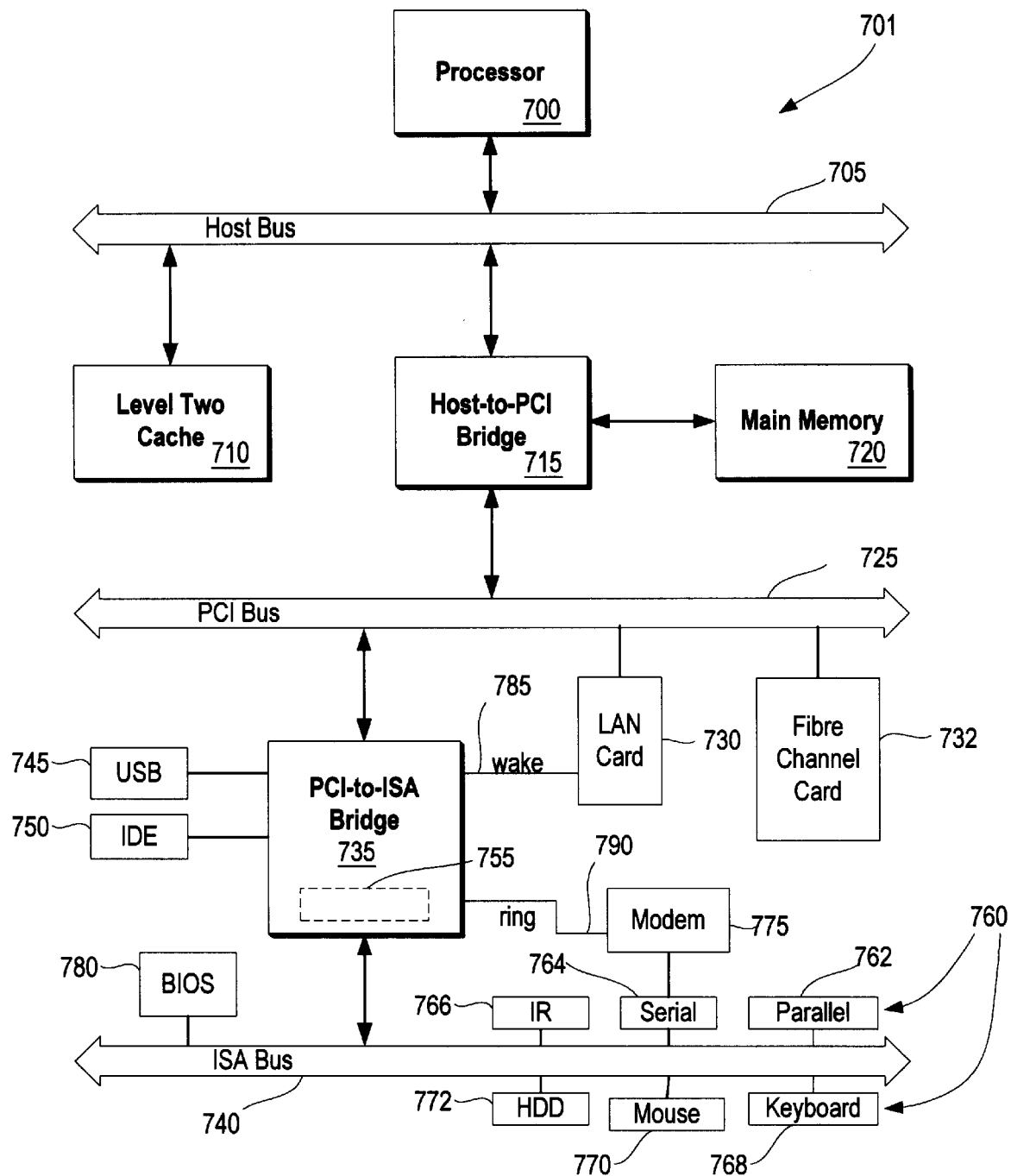
FIG. 7 is a block diagram of an information handling system capable of performing the present invention.

FIG. 7 illustrates information handling system 701 which is a simplified example of a computer system capable of performing the copy processing described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method for managing file export information, said method comprising:

determining file export information corresponding to a file, wherein the file export information includes a pathname corresponding to the file and one or more user access privileges corresponding to the file;

registering the file export information in an extended attribute data area corresponding to the file, whereby the extended attribute data area is located in a first file system that corresponds to the file;

retrieving the file export information in response to a mount request that corresponds to the file; and releasing the file export information in response to an unmount request that corresponds to the file.

2. The computer implemented method as described in claim 1 wherein the retrieving is performed in response to the first file system accessing the file.

3. The computer implemented method as described in claim 1 further comprising:

duplicating the file wherein the duplicating includes copying the file export information from the first file system to a second file system.

4. The computer implemented method as described in claim 1 wherein the mount request is performed by a client computer system, the method further comprising:

determining whether the client computer system is authorized to retrieve the files using the file export information, the determining performed by a server computer system that maintains the file export information;

returning an error from the server to the client in response to determining that the client is not authorized; and returning an authorization from the server to the client in response to determining that the client is authorized.

5. The computer implemented method as described in claim 1 wherein the determining further includes:

reading default file export information; and copying the default file export information to the file export information.

6. An information handling system comprising:

one or more processors;

a memory accessible by the processors;

a nonvolatile storage area accessible by the processors, the nonvolatile storage area including:

one or more files, wherein at least one of the files includes an extended attribute data area;

a file export management tool to manage file export information, the file export management tool including:

means for determining file export information corresponding to one of the files, wherein the file export information includes a pathname corresponding to one of the files and one or more user access privileges corresponding to one of the file;

means for registering the file export information in an extended attribute data area corresponding to the file, whereby the extended attribute data area is located in a first file system that corresponds to one of the files;

means for retrieving the file export information in response to a mount request that corresponds to one of the files; and means for releasing the file export information in response to an unmount request that corresponds to one of the files.

7. The information handling system as described in claim 6 further comprising:

means for duplicating the file wherein the duplicating includes copying the file export information from the first file system to a second file system.

8. The information handling system as described in claim 6 wherein the mount request is performed by a client computer system, the information handling system further comprising:

means for determining whether the client computer system is authorized to retrieve the files, the determining performed by a server computer system that maintains the file export information;

means for returning an error from the server to the client in response to determining that the client is not authorized; and means for returning an authorization from the server to the client in response to determining that the client is authorized.

9. The information handling system as described in claim 6 wherein the determining further includes:

means for reading default file export information; and means for copying the default file export information to the file export information.

10. A computer program product stored on a computer operable medium for managing file export information, said computer program product comprising:

means for determining file export information corresponding to one of the files, wherein the file export information includes a pathname corresponding to the file and one or more user access privileges corresponding to the file;

means for registering the file export information in an extended attribute data area corresponding to the file, whereby the extended attribute data area is located in a first file system that corresponds to the file;

means for retrieving the file export information in response to a mount request that corresponds to the file; and means for releasing the file export information in response to an unmount request that corresponds to the file.

11. The computer program product as described in claim 10 wherein the means for retrieving is performed in response to the first file system accessing the file.

12. The computer program product as described in claim 10 further comprising:

means for duplicating the file wherein the duplicating includes copying the file export information from the first file system to a second file system.

13. The computer program product as described in claim 10 wherein the mount request is performed by a client computer system, the computer program product further comprising:

means for determining whether the client computer system is authorized to retrieve the files using the file export information, the determining performed by a server computer system that maintains the file export information;

means for returning an error from the server to the client in response to determining that the client is not authorized; and means for returning an authorization from the server to the client in response to determining that the client is authorized.

14. The computer program product as described in claim 10 wherein the determining includes:

means for reading default file export information; and means for copying the default file export information to the file export information.

* * * * *